United States Patent [19]
Burgy et al.

[11] Patent Number: 5,156,534
[45] Date of Patent: Oct. 20, 1992

[54] ROTARY MACHINE HAVING BACK TO BACK TURBINES

[75] Inventors: N. Frank Burgy, Palm Beach Gardens; Alfred M. Palgon, Coral Springs; Bruce R. Branstrom, Palm Beach Gardens, all of Fla.

[73] Assignee: United Technologies Corporation, Hartford, Conn.

[21] Appl. No.: 577,416

[22] Filed: Sep. 4, 1990

[51] Int. Cl.⁵ .................................. F04B 17/00
[52] U.S. Cl. .................... 417/405; 417/350; 415/60
[58] Field of Search ............ 417/405, 407, 408, 409, 417/360, 406, 350; 415/60, 65

[56] References Cited

U.S. PATENT DOCUMENTS

| | | | |
|---|---|---|---|
| 3,523,428 | 8/1970 | Nagyszalanczy | 415/60 |
| 4,083,180 | 4/1978 | Thompson | 60/39.161 |
| 4,155,684 | 5/1979 | Curiel | 417/409 |
| 4,610,235 | 9/1986 | Grunig | 417/406 |

FOREIGN PATENT DOCUMENTS

| | | | |
|---|---|---|---|
| 556473 | 4/1958 | Canada | 417/405 |
| 1078712 | 4/1953 | France | 417/406 |
| 794991 | 5/1958 | United Kingdom | 417/381 |

Primary Examiner—Richard A. Bertsch
Assistant Examiner—Peter Korytnyk
Attorney, Agent, or Firm—Gene D. Fleischhauer

[57] ABSTRACT

A rotary machine having a pair of back to back turbines in serial flow relationship is disclosed. Various construction details are developed which permit for a compact design. In one detailed embodiment the turbine has a housing having an inlet manifold and an exit manifold which are disposed between the outlet manifold for an associated turbopump.

17 Claims, 2 Drawing Sheets

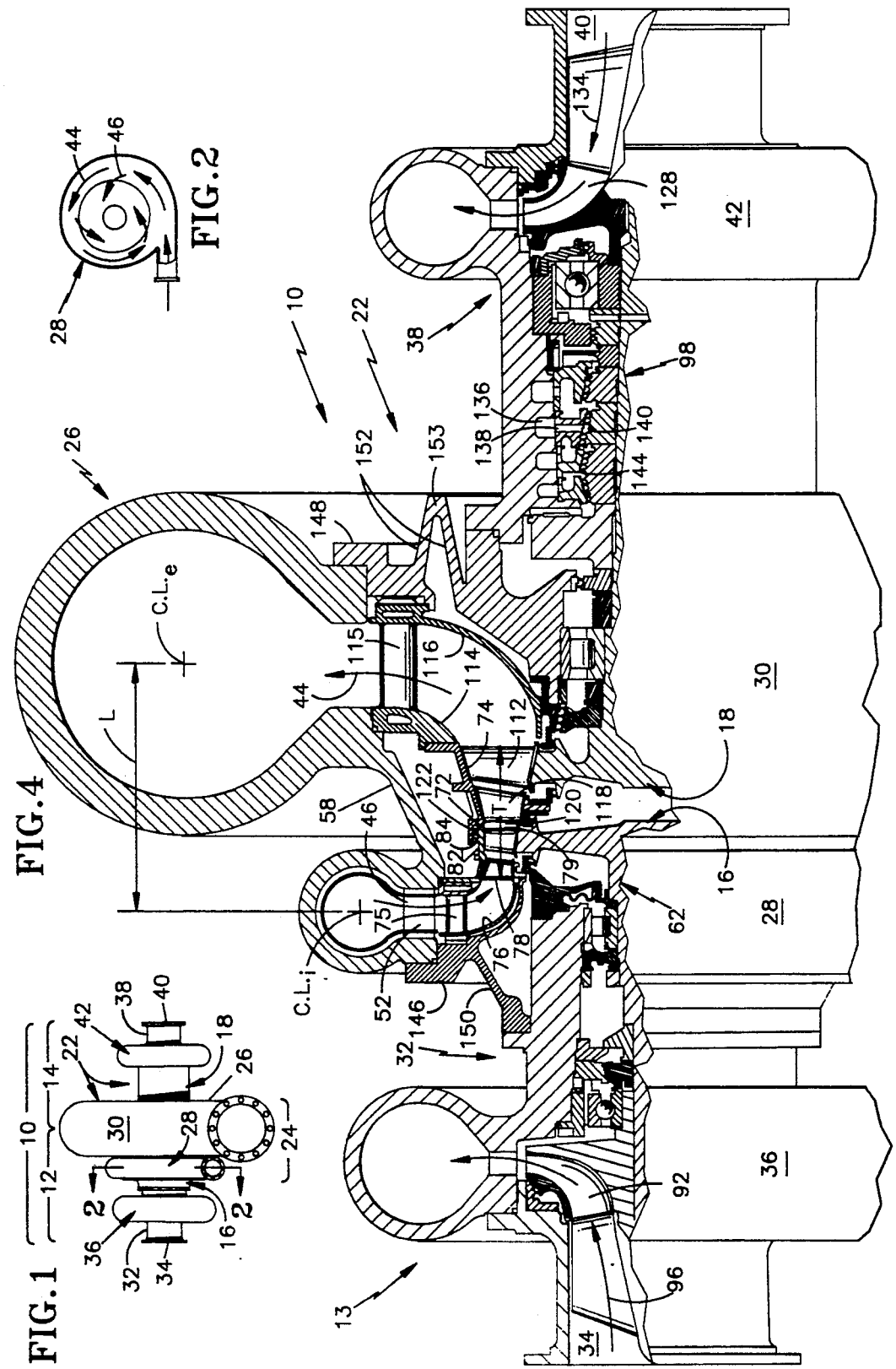

ROTARY MACHINE HAVING BACK TO BACK TURBINES

The invention described herein was made in the performance of work under NASA contract and is subject to the provisions of Section 305 of the National Aeronautics and Space Act of 1958 (72 Stat. 435; 42 U.S.C. 2457).

DESCRIPTION

1. Technical Field

This invention relates to a rotary machine having a pair of turbines in back to back relationship. More particularly, the invention relates to a pair of turbopumps mounted back to back in a housing for the turbopumps. It has particular application to rocket engines for pumping cryogenic fuel and oxygen to the rocket engine, but has application to other fields employing rotary machines.

2. Background of Invention

A rocket engine is typically provided with a reservoir of cryogenic fuel and a reservoir of cryogenic oxidizer for the fuel. The cryogenic fuel and cryogenic oxygen are pumped in liquid form to the rocket chamber where the fuel and oxidizer are burned to produce thrust for the rocket. Turbopumps for pumping these fuels may be used. Each turbopump has a turbine which is driven by hot working medium gases supplied by a gas generator.

In prior constructions, the two turbopumps were driven by individual turbines each having their own gas generator or having a common gas generator. In those units using a common gas generator, the working medium gases used to drive the turbines were typically ducted from the turbine of one pump to the turbine of the other pump. This required a duct or ducts for the hot gases between the turbines and added turbine stagings and airfoils to each turbopump.

Accordingly, scientists and engineers working under the direction of Applicants assignee have sought to simplify the design of such rotary machines and to provide for simplified ducting with reduced flow losses.

DISCLOSURE OF INVENTION

According to the present invention, a rotary machine has a pair of back to back turbines in serial flow relationship and a stator assembly circumscribing the turbines which has an inlet manifold and an exit manifold for the turbines radially outward of and extending circumferentially about the turbines.

In accordance with the present invention, the rotary machine drives two other rotary machines, such as centrifugal pumps, that are each integrally joined to a turbine by a rotor shaft.

In accordance with one detailed embodiment of the present invention, the stator assembly includes a housing for the turbine manifolds and further includes outlet manifolds for the pumped fluids on either side of the turbine manifolds which are connected by radially flexible casing structure to the housing to accommodate differences in thermal growth between the manifolds for the pumped fluid and the manifolds for the turbine gases.

A primary feature of the present invention is a rotary machine having a pair of back to back turbines in serial flow relationship. Another feature is a rotor assembly for each pump having an array of rotor blades in back to back relationship inwardly of the housing, the rotor assemblies extending in opposite directions. In one embodiment, a feature is a pair of centrifugal pumps each integrally joined to an associated turbine. The stator assembly for the turbopumps includes a housing having a turbine inlet manifold and a turbine exit manifold in close proximity connected by a member that is relatively flexible in the radial direction. Each turbopump has its own casing having an outlet manifold for the pumped fluid. Each casing carries the inlet guide vanes for the turbine associated with the turbopump. Another feature is a stator assembly which includes a member extending between each turbine manifold of the housing and an outlet manifold for the adjacent turbopump that has increased radial flexibility (decreased radial stiffness characteristic) in comparison to the adjacent stator structure. This permits thermal growth between the turbine housing and the casing for the adjacent turbopumps. Another feature in one detailed embodiment is a piston ring seal disposed between the first turbopump casing and the second turbopump casing inwardly of the housing to permit sliding engagement in the axial direction between the adjacent turbopumps.

A primary advantage of the present invention is the size of a rotary machine having two turbines which results from the back to back relationship of the turbines. Another advantage is the machine efficiency and simplicity of design which results from flowing the working medium gases directly out of one turbine into the adjacent turbine and thence from the turbine exit to the turbine exit manifold. Still another advantage is the fatigue life of the stator assembly which results from accommodating differences in thermal growth between the turbine housing and the turbopump casings by using a radially flexible member to connect the turbopumps to the housing. In one particular embodiment, an advantage is the simplicity of the design which results from employing a one piece manifold housing to duct the turbine gases and to support the turbopumps. Still another advantage is the ease of assembly which results from the modular nature of the rotary machine by using a housing and two turbopumps in a back to back relationship where each turbopump may be slid as a unit into the housing.

The foregoing features and advantages of the present invention will become more apparent in light of the following detailed description of the best mode for carrying out the invention and the accompanying drawings.

BRIEF DESCRIPTION OF DRAWINGS

FIG. 1 is a side elevation view of a rotary machine having a pair of back to back turbopumps and back to back rotor assemblies.

FIG. 2 is a view taking along the lines 2—2 of FIG. 1.

FIG. 4 is a side elevation view corresponding to the view shown in FIG. 2 in the assembled condition.

BEST MODE FOR CARRYING OUT THE INVENTION

Figure 3:
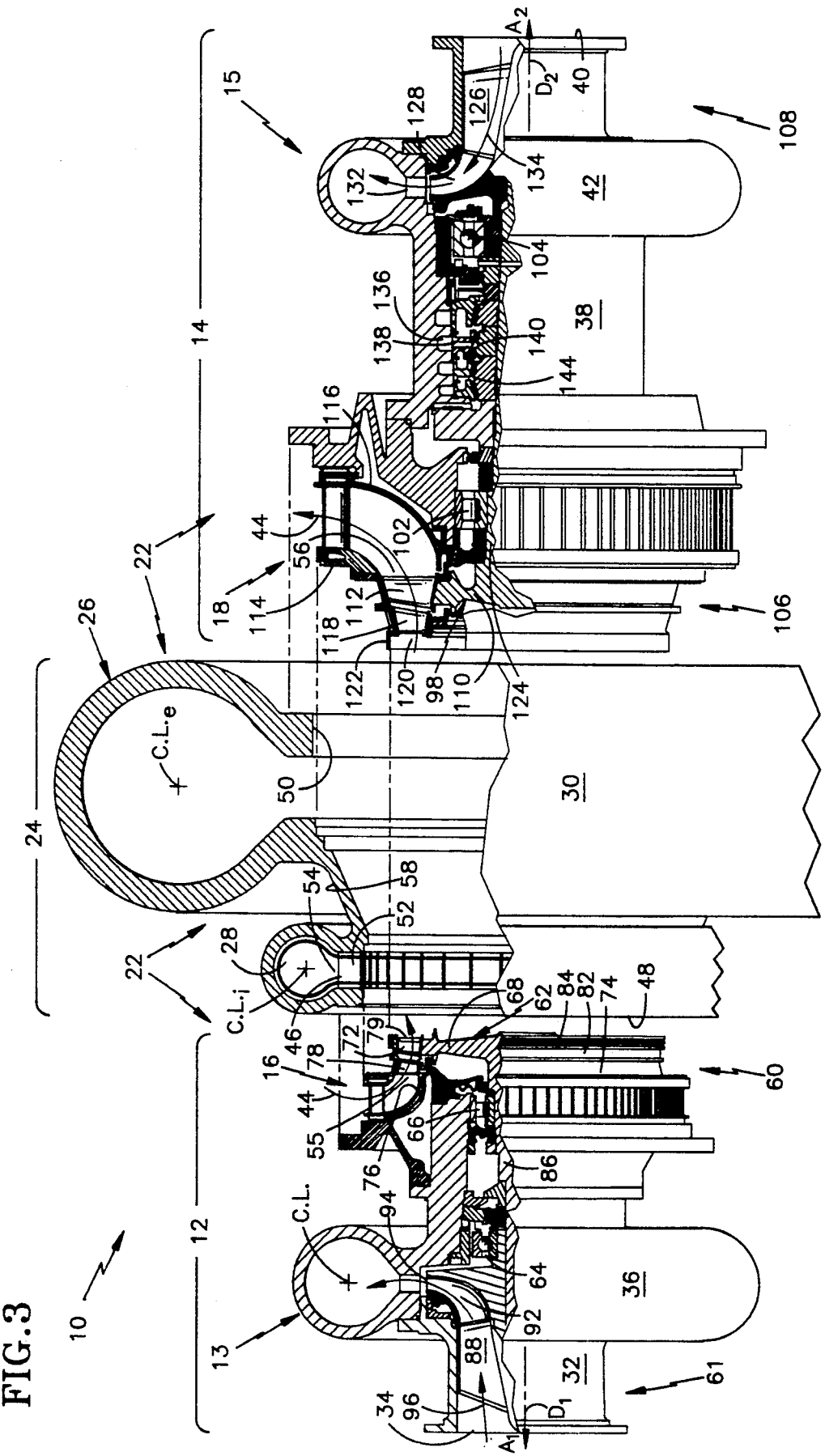
FIG. 3 is an enlarged side elevation view of the rotary machine shown in FIG. 1 partly in cross section partly in full which is exploded to show the relationship of the turbopump sections to the housing section.

FIG. 1 is a side view of a rotary machine assembly 10 having a pair of turbopump sections 12, 14. Each turbopump section has a turbine 16, 18. The rotary machine includes a stator assembly 22 having a housing section 24 for the turbopumps. The housing section has a housing 26 which includes an inlet manifold 28 for both turbines and an exit manifold 30 for both turbines.

The first turbopump section 12 is of the type used in rocket engines as a fuel pump for pumping cryogenic hydrogen. The stator assembly 22 of this section includes a casing 32 having a pump inlet 34 for a first fluid (such as hydrogen) and an outlet manifold 36 for exhausting the pressurized fuel.

The second turbopump section 14 has a casing 38 which forms a portion of the stator assembly 22. The second turbopump section is of the type used as an oxidizer pump and has a pump inlet 40 which adapts the turbopump to receive a second fluid, such as an oxidizer for the fuel (typically, cryogenic oxygen). The casing includes an outlet manifold 42 for exhausting the oxidizer.

In the embodiment shown, all manifolds are volutes, that is, are tapered to maintain the pressure and velocity of the working medium gases as the gases are flowed circumferentially and inwardly to the turbine. Other configurations might be used for the manifolds.

FIG. 2 is a schematic view taken along the lines 2—2 of FIG. 1 through the turbine inlet volute 28. The turbine inlet volute adapts the housing to be in flow communication with a source of hot, pressurized working medium gases. The source of these pressurized working medium gases is a gas generator (not shown).

FIG. 2 is partially in full and partially broken away to show the flowpath 44 for working medium gases entering the turbine inlet volute. The flowpath for working medium gases extends circumferentially about the volute and radially inwardly through openings 46 to supply the gases to the turbine 16 of the first turbopump 13.

FIG. 3 is an enlarged side elevation view of partially in section and partially in full which is exploded to show the relationship of the turbopumps 13, 15 to the housing 26. In this embodiment, the turbopumps are used to pump two fluids, cryogenic hydrogen and cryogenic oxygen. In other constructions, the second fluid might be the first fluid after it exits the first turbopump at a higher pressure than the first fluid entering the first turbopump. Thus, the term "second fluid" includes a fluid of the same chemical composition but at a different density and pressure than the fluid entering the first turbopump. In such constructions, the outlet volute 36 of the first turbopump would be connected to the inlet 40 of the second turbopump.

The housing section has a first opening 48 facing in a first axial direction $D_1$ which adapts the housing to receive the first turbopump section 12. The housing section has a second opening 50 facing in a second axial direction $D_2$ which is opposite to the first axial direction. The second opening adapts the housing to receive the second turbopump section 14.

A plurality of structural struts 52 extend across the throat 54 of the inlet volute 28 of the turbines 16, 18. The throat places the inlet volute in flow communication with the inlet 55 to the first turbine 16.

The turbine exit volute 30 extends circumferentially in the same manner as does the turbine inlet volute 28. The turbine exit volute is in flow communication with the exit 56 of the turbine of the second turbopump 15. The turbine exit volute adapts the housing to discharge the exhausted turbine gases from the housing.

The housing section 24 includes a housing section member 58 extending between the turbine inlet volute 28 and the turbine exit volute 30. The housing section member has a radial stiffness characteristic which is less then the radial stiffness characteristic of the turbine inlet volute and the radial stiffness characteristic of the turbine outlet volute to impart a degree of radial flexibility between the two volutes.

The first turbopump section 12 has a first end 60 and a second end 61. A rotor assembly 62 has an axis of rotation $A_1$. A pair of bearings 64, 66 are disposed between the housing and the rotor assembly to rotatably support the rotor assembly within the housing. The rotor assembly includes elements of the first turbine at the first end.

The rotor assembly at the first end 60 has a rotor disk 68 and an array of rotor blades 72 which extend outwardly from the disk into close proximity with the casing 32. The casing includes an outer flowpath wall 74 and an inner flowpath wall 76. The outer wall 74 and the inner wall 76 bound the flowpath for hot working medium gases 44 which extends from the turbine inlet volute 28 to the inlet 55 of the turbine. An array of radially extending stator vanes 78, such as inlet guide vanes at the inlet to the turbine, are disposed upstream of the array of rotor blades 72 at the exit 79 of the turbines.

The outer flowpath wall 74 has an axially extending seal member 82 which faces in the radial direction. The seal member is spaced radially from the array of rotor blades 72 and blocks the flow of working medium gases 44 around the array of rotor blades. The seal member also carries sealing structure 84 which faces outwardly and is adapted to slidably engage cooperating sealing structure on the second turbopump.

The rotor assembly includes a rotor shaft 86 which extends axially about the axis of rotation $A_1$ in the first direction $D_1$ to the second end 61 of the first turbopump. The rotor assembly at the second end includes an inducer 88 and a centrifugal pump 92. The centrifugal pump has a pump outlet 94. A flowpath 96 for the pumped first fluid extends axially through the inducer and then radially through the centrifugal pump portion of the rotor assembly to the outlet volute 36 for the first pump. The flow extends circumferentially through the volute and is exhausted from the first turbopump section.

As shown by the exploded view, the rotor assembly 62 and the stator assembly 22 of the first turbopump section 12 form a modular unit which may be removed as one piece from the housing section 24.

The second turbopump section 14 has a rotor assembly 98 and a casing 38 which are functionally similar to the first turbopump section 12. The rotary assembly has an axis of rotation $A_2$. The casing extends circumferentially about the rotor assembly and forms part of the stator assembly 22 of the rotary machine. A first bearing 102 and a second bearing 104 are disposed in the rotary machine to rotatably support the rotor assembly from the casing.

The second turbopump section 14 has a first end 106 and a second end 108. At the first end, the rotor assembly 98 has a rotor disk 110 and an array of rotor blades 112 adjacent to the rotor disk 68 and blades 72 of the first rotor assembly 62 when assembled. The rotor blades 112 extend radially outwardly across the flowpath for working medium gases 44 into proximity with the casing 38. The rotor blades form the exit 56 of the turbine. The casing has an outer wall 114, an inner wall 116, and an array of guide vanes 118 at the inlet 120 to the second turbine. The inlet guide vanes extend outwardly across the working medium flowpath between the walls upstream of the array of rotor blades. An annular seal member 122 extends axially from the array of stator vanes. The seal member adapts the casing to slidably engage in the axial direction the corresponding axial seal member 82 and seal structure 84 on the casing of the first turbopump section 12.

The rotor assembly 98 has a shaft 124 which extends axially in the second direction $D_2$ from the rotor disk 110 of the turbine and the array of rotor blades 112 which extend outwardly from the disk. As a result, the turbines of the first turbopump and second turbopump are in a back to back relationship.

The rotor assembly 98 at the second end 108 has an inducer 126, and a centrifugal pump 128. The centrifugal pump has a pump outlet 132. A flowpath 134 for the second pumped fluid extends through the inducer and centrifugal pump. The second pumped fluid is flowed through the pump inlet 40 to the second turbopump 15 along the pumped fluid flowpath 134 to the outlet volute 42.

The stator assembly 22 includes at least one circumferentially extending passage 136 which adapts the stator assembly to receive high pressure helium from a source of helium (not shown). In the embodiment shown, the passage 136 is located in the casing 38 of the second turbopump 15. A plurality of radial conduits 138 place the helium passage 136 in flow communication with an annular opening 140 between the rotor assembly 98 and the stator assembly. A plurality of labyrinth seals 144 on either side of this annular opening block the flow of helium in either direction and provide a buffer between the rotating structure and the stationary structure of the rotary machine that extends between the fuel and the oxidizer flowpaths 96, 134.

FIG. 4 is a view corresponding to the exploded view of FIG. 3 showing the components of the engine in the assembled condition. As can be seen from this view, the rotary machine 10 is an assembly of three rotary machines. The first rotary machine includes the first turbine 16 and the second turbine 18 in a back to back relationship. These turbines might be used to drive other rotary machines, such as generators or pumps. In the embodiment shown, the second rotary machine and the third rotary machine are the centrifugal pumps 92, 128 which, with the turbines 16, 18 form the turbopumps 13, 15.

The stator assembly 22 of the rotary machine 10 includes an annular flange 146, 148 on each turbopump. The flanges are integrally joined to the housing 26. The first flange 146 on the first turbopump is joined to the turbine inlet volute 28. The second flange 148 on the second turbopump is joined to the turbine exit volute 30.

Each annular flange is integrally attached to and supports and positions the flowpath walls of the turbine 74, 76, 114, 116, the flowpath struts 75, 115 and the inlet guide vanes 78, 118 and seal members 82, 84 for each turbine of the associated turbopump. Thus, the turbine stator assembly, although a part of each modular turbopump, is integrally joined to the housing which contains the turbine inlet and exit volutes carrying high temperature working medium gases.

Each of these annular flanges 146, 148 is joined to the remainder of the casing 32, 38 of the associated turbopump section by an associated casing element or member 150, 152. The casing element has a stiffness characteristic which is less than the stiffness characteristic of the associated annular flange or the remainder of the inner casing. The casing element for the first turbopump section is a frustoconical member which extends axially. The casing element for the second turbopump section is in the form of two frustoconical members joined together at a flange 153.

Because of the radial flexibility of these casing elements, the first axial member 150 and the second axial member 152 permit relative radial growth in response to differences in temperature between the housing section 24 (and its turbine manifolds 28, 30) and the turbopump sections 12, 14 (and their outlet manifolds 36, 42) thereby accommodating differences in thermal growth between the three sections of the machine.

The axial seal member 82 at the first end 60 of the first turbopump and the axial seal member 122 at the first end 106 of the second turbopump extend axially with respect to each other to form a seal that allows for relative axial movement between the turbopumps. The seal structure 84, as represented by a plurality of piston ring type seals, is disposed between the adjacent axial seal members to provide sealing to the slight radial gap that exists for assembly. As will be realized, many other constructions which enable slidable movement while providing sealing between the two structures might be used. One example would be a series of brush seals facing seal lands which extend circumferentially and which carry an abradable material.

The turbine inlet volute 28 has a first center line CLi and the turbine exit volute 30 has a second center line CLe. The second center line is spaced axially by a distance L from the first center line. In the turbine, the first array of stator vanes (first airfoil) 78 of the first turbopump has a leading edge region and the last array of rotor blades (last airfoil) 112 of the second turbopump has a trailing edge region. The trailing edge region and the leading edge region are spaced apart by a distance T at the mean line of the airfoils, and the distance L between the center lines of the manifolds is two and a half times to six and a half times the distance T. The vanes and blades are disposed radially inwardly of and axially aligned with the structure of the housing disposed between the two center lines over the length L. This provides for a compact construction with the turbines of both turbopumps being located in close proximity to the turbine inlet and outlet volutes.

During operation of the rotary machine 10 shown in FIG. 4, hot working medium gases are flowed along the flowpath 44 for working medium gases. The flowpath extends from the turbine inlet volute 28 serially through the turbine 16 of the first turbopump and through the turbine 18 of the second turbopump and thence to the turbine exit volute 30 where the gases are collected. As the gases are flowed along the flowpath, the gases are guided by the aerodynamic stator vanes 78, 118 prior to entry of the gases into the adjacent array of rotor blades 72, 112. The rotor assemblies are driven about their axis of rotation by the expanding gases causing the temperature and pressure of the gases to decrease. In the embodiment shown, the axes of rotation $A_1$ and $A_2$ are coincident. In other constructions, these axes might be displaced radially.

In one embodiment, the working medium gases are a hydrogen-rich steam formed by burning hydrogen and oxygen in a gas generator (not shown). The entry temperature of the gases at turbine inlet volute may be as high as fifteen hundred (1500) degrees Fahrenheit with the temperature of the steam having been lowered by injecting more hydrogen than is required for combustion. The exit temperature at the turbine exit volute is approximately eight hundred (800) degrees Fahrenheit. This temperature in a rocket nozzle is relatively cool in comparison to the temperature of the rocket nozzle. The gases may be exhausted from the turbine exit volute 30 to the rocket nozzle to film cool the rocket nozzle.

The pump 92, 128 of each turbopump section is integrally joined to the rotor assembly 62, 98 of the associated turbine 16, 18. As these two rotary machines are driven about the axis of rotation, each pumped fluid enters the inlet 34, 40 to the turbopump and is driven radially outwardly by the action of the inducer and the centrifugal compressor. The pressurized high velocity fluid is collected in the outlet volute 36 for the hydrogen at a temperature of approximately four hundred (−400) degrees Fahrenheit below Zero and for the oxygen at volute 42, approximately two hundred eighty (−280) degrees Fahrenheit below Zero. The large difference in temperature between the fuel pump outlet volute and oxidizer pump outlet volute (respectively −400° F. and −200° F.) and the temperature of the turbine inlet volute and the turbine outlet volute (respectively, 1500° F. and 800° F.) causes large differences in thermal expansion between the casing members.

The reduced stiffness characteristics of the two casing members 150, 152 (which extend between the remainder of the casing 32, 38 and the annular flange 146, 148 positioning the turbine section of each turbopump) allow for relative radial movement between these structures. This decreases thermally induced stresses from differences in thermal expansion. In addition, the housing section is provided with a housing member 58 having a reduced stiffness characteristic as compared to the adjacent turbine volutes 28, 30. This permits radial growth between the turbine inlet volute (1500° F.) and the turbine exit volute (800° F.) which reduces thermally induced stresses in the housing section.

The compact nature of the rotary machine 10 results from orienting the turbopumps (and thus the rotor assemblies) in a back to back relationship. Compactness is further promoted by forming the turbopumps as modules having rotating blades at either end of the modules, as represented by the inducer, centrifugal pump at one end of the rotor assembly and the rotor blades at the other end of the rotor assembly; and, by disposing the airfoils of the turbine entirely within the housing section 24.

The compact nature of the design is emphasized by the relationship between the axial chords of the airfoils in the turbine section in comparison to the length L between the center lines of the inlet and outlet volutes of the turbine. In considering designs formed with the teaching of back to back turbopumps, the distance between the center line of the inlet turbine volute and the exit turbine volute (that is the distance L) is only 2.5 to approximately 6.5 times the chord length distance T, measured along the mean line of the stator airfoils and the rotor airfoils. As can be seen, this results in a compact design with the inlet volute and the exit volute of the turbines being disposed between the outlet volutes for the first pumped fluid and for the second pumped fluid and outwardly of the turbine elements.

Another advantage is the engine efficiency and simplicity which results from eliminating ducting and flow losses the working medium gases from the exit 79 of one turbine to the inlet 120 of another turbine as compared to constructions where the turbines are located at locations remote from each other. As will be realized, the rotors may rotate in the same direction or may counter-rotate with respect to each other further reducing the need for inlet guide vanes between the adjacent rows of rotor blades. In an alternate embodiment, the counter rotating turbines may even permit the elimination of an inlet guide vane between adjacent arrays of rotor blades.

In the embodiment shown, the turbine housing 26 is formed of a one piece structure which reduces the number of parts required to form the rotary machine. The annular flanges 146, 148 of the turbopumps carry the stationary structure of the turbines and integrally join this stator structure to the turbine casing. This ties the portions of the stator assembly which form the turbines in the turbopumps to the one piece housing causing the one piece housing to act as an integral assembly with the turbine stationary structure. This reduces the effect of that relative thermal expansion between the housing and pump manifolds has on turbine operating clearances, further promoting the efficiency of the system. This is promoted by reason of the thermally compliant members which extend from the annular flanges to the remainder of the inner casing of each of the turbopumps.

The modular nature of the turbopump design is made possible by the thermally compliant members 150, 152 that support the stationary turbine components from remainder of the turbopump casing. Simplicity of assembly results from the outer housing providing a base for mounting the modular self-supporting first turbopump extending in a first axial direction from the housing and for mounting the modular self-supporting second turbopump extending in a second axial direction from the housing.

Although the invention has been shown and described with respect to detailed embodiments thereof, it should be understood by those skilled in the art that various changes in form and detail thereof may be made without departing from the spirit and the scope of the claimed invention. In particular, the manifolds may be of any shape or configuration and need not be volutes.

We claim:

1. A first rotary machine having a pair of turbines each having an axis of rotation for driving a second rotary machine and a third rotary machine which are each driven by one of the turbines, which comprises:

a stator assembly which extends circumferentially about an axis having
an inlet manifold for the turbines which extends circumferentially about the stator assembly,
an exit manifold for the turbines which is axially adjacent to the inlet manifold and is spaced axially from the inlet manifold leaving an axial length L between the center lines of the manifolds, a first turbine disposed about its axis of rotation, positioned by the stator assembly and extending in a first axial direction from the manifolds, the first turbine having a first array of rotor blades which extends radially outwardly toward the stator assembly;

a second turbine adjacent to the first turbine which is disposed about an axis of rotation, positioned by the stator assembly and extending in a second axial direction from the manifolds which is opposite to the first axial direction, the second turbine having a second array of rotor blades which extends radially outwardly toward the stator assembly;

a flowpath for working medium gases which extends in succession from the turbine inlet manifold through the first array of rotor blades of the first turbine, through the second array of rotor blades of the second turbine and thence to the exit manifold of the turbine; wherein the arrays of rotor blades are radially inward of the manifolds and axially aligned with the length L between the center lines of the turbine manifolds.

2. The rotary machine of claim 1 wherein the first turbine is adapted by its array of rotor blades to rotate in a first circumferential direction and the second turbine is adapted by its array of rotor blades to rotate in a second circumferential direction opposite to the first circumferential direction.

3. The rotary machine of claim 1 wherein the stator assembly includes a housing section having openings which face in opposite axial directions and which adapt the housing to receive the second rotary machine and the third rotary machine.

4. The rotary machine of claim 3 wherein the second rotary machine is a first pump and the third rotary machine is a second pump and wherein the pumps have casings which form a portion of the stator assembly of the first rotary machine in the assembled condition and are driven by the turbines of the first rotary machine.

5. The rotary machine of claim 4 wherein each turbine of the first rotary machine is integrally joined to the associated pump to form a turbopump section.

6. The rotary machine of claim 5 wherein the three rotary machines form a rotary machine assembly having three modules which include a housing section or module and two turbopump sections or modules, each turbopump section having a casing joined to the housing section which forms a portion of the stator assembly, an assembly which includes an array of rotor blades and which is supported from the casing, and an array of stator vanes adjacent to the rotor blades which are attached to the casing and wherein the turbopumps are disposed in a back to back relationship.

7. The rotary machine of claim 6 wherein each of the turbopump sections includes a flowpath for pumped fluid and has a circumferentially extending manifold for receiving fluid which is spaced axially from the turbine manifolds and wherein the stator assembly includes a member disposed between the turbine manifolds and the turbopump manifold having a smaller radial stiffness characteristic than the radial stiffness characteristic of the manifolds to permit relative thermal growth therebetween.

8. A rotary machine having an axis of rotation and a pair of turbopump sections disposed about the axis of rotation, each turbopump section including a pump having an inlet, an outlet and a flowpath for a pumped fluid extending from the inlet to the outlet, a turbine having an inlet, an exit, a flowpath for working medium gases extending from the inlet to the exit, an axis of rotation and a rotor assembly disposed about the axis of rotation which is drivingly connected to the pump, the rotary machine including a stator assembly for supporting the rotor assemblies, which comprises:

a housing section having a housing which forms a portion of the stator assembly and which has a first opening facing in a first axial direction which adapts the housing to receive a first turbopump section, a second opening facing in a second axial direction which is opposite to the first axial direction and which adapts the housing to receive a second turbopump section, a turbine inlet manifold which adapts the housing to be in flow communication with a source of hot, pressurized working medium gases and to flow the gases to the inlet of the turbine of the first turbopump section, the manifold having a center line and the housing having a first stiffness characteristic in the region of the turbine inlet manifold, a turbine exit manifold spaced axially in the second direction from the turbine inlet manifold which adapts the housing to be in flow communication with the exit of the turbine of the second turbopump and to discharge the exhausted turbine gases from the housing, the housing having a second stiffness characteristic in the region of the turbine exit manifold, a housing section member extending between the turbine inlet manifold and the turbine exit manifold having a stiffness characteristic which is less than the first stiffness characteristic and the second stiffness characteristic of the manifolds;

a first turbopump section having a first pump, a flowpath for a pumped first fluid extending through the pump, the turbopump section having a casing which forms a portion of the stator assembly and which extends circumferentially about an axis, the casing having a first end which is joined to the housing adjacent to the turbine inlet manifold, a second end having the pump which is adapted by an opening to receive the pumped fluid, and having an outlet manifold for the first fluid which extends circumferentially about the outer casing and which is spaced axially from the turbine inlet manifold in the first axial direction, the casing having an inner wall and an outer wall which bound the flowpath for working medium gases to the turbine inlet, the casing including at least one array of inlet guide vanes which extend across the working medium flowpath from the inner wall to the outer wall and a seal member which extends axially from the outer wall, a rotor assembly for the first pump which includes an array of rotor blades which extend outwardly across the working medium flowpath into proximity with the casing and a shaft which extends in the first axial direction to the second end of the casing, the rotor assembly including an inducer and a centrifugal pump which extend along the flowpath for pumped fluid to receive the pumped fluid and discharge the pumped fluid into the outlet manifold for the first fluid;

a second turbopump section having a second pump, a flowpath for a pumped second fluid extending through the pump, the turbopump section having a casing which forms a portion of the stator assembly and which extends circumferentially about an axis, the casing having a first end which is attached to the housing adjacent to the turbine exit manifold, a second end having the pump which is adapted by an opening to receive the pumped fluid, and having an outlet manifold for the second fluid which extends circumferentially about the outer casing and which is spaced axially from the turbine exit manifold in the second axial direction, the casing having an inner wall and an outer wall which bound the flowpath for working medium gases which extends through the casing to the turbine exit, the casing including at least one array of guide vanes which extend across the working medium flowpath from the inner wall to the outer wall and a seal member which extends axially from the outer wall into proximity with the seal member of the first turbopump section to provide a seal structure between the adjacent rotor assemblies, a rotor assembly for the second pump which includes an array of rotor blades which extend outwardly across the working medium flowpath into proximity with the casing and a shaft which extends in the second axial direction to the second end of the casing, the rotor assembly including an inducer and a centrifugal pump which extend along the flowpath for pumped fluid to receive the pumped fluid and discharge the pumped fluid into the outlet manifold for the first fluid;

wherein the outer housing provides a base for mounting a modular self-supporting first turbopump extending in a first axial direction from the housing and for mounting a modular self-supporting second turbopump extending in a second axial direction from the housing.

9. The rotary machine of claim 8 wherein the outlet manifold of the first turbopump section has a third stiffness characteristic, the stator assembly further including a first member disposed between the turbine inlet manifold and the outlet manifold of the first turbopump which has a stiffness characteristic which is less than the first stiffness characteristic of the turbine inlet manifold and the third stiffness characteristic of the outlet manifold, and wherein the outlet manifold of the second turbopump section has a fourth stiffness characteristic, the stator assembly further including a second axially extending member disposed between the turbine exit manifold and the outlet manifold of the second turbopump, the second axially extending member having a stiffness characteristic which is less than the second stiffness characteristic of the turbine exit manifold and the fourth stiffness characteristic of the outlet manifold of the second turbopump such that the first axial member and the second axial member permit relative radial growth in response to differences in temperature between the housing section with its turbine manifolds and the turbopump sections with their outlet manifolds thereby relieving thermal stresses between the three sections of the machine.

10. The rotary machine of claim 8 which further has at least one circumferentially extending piston ring extending between the axially extending seal member of the first turbopump section and the axially extending seal member of the second turbopump section, at least one of said seal members being adapted by a circumferentially extending groove to accept the piston ring, the piston ring slidably engaging in the axial direction the remaining axially extending member.

11. The rotary machine of claim 8 wherein the housing is formed as a one-piece unit.

12. The rotary machine of claim 9 wherein each turbopump section includes an annular member having a flange which is attached to the housing section adjacent to one of said manifolds, said inner wall and said outer wall and said stator vanes for said turbopump section being attached to said annular member and said first axial member which has a smaller stiffness characteristic, extends from said annular member to join the annular member to the remainder of the casing of the associated turbopump while permitting relative radial growth between the casing and the turbine structure.

13. The rotary machine of claim 8 wherein the turbine inlet manifold has a first center line and the turbine exit manifold has a second center line spaced axially by a distance L from the first center line and wherein the first array of stator vanes of the first turbopump has a leading edge region and the last array of rotor blades of the second turbopump has a trailing edge region and wherein the trailing edge region and the leading edge region are spaced apart by a distance T, and the distance L between the center lines of the manifolds is two and a half times to six and a half times the distance T and the vanes and blades are disposed radially inwardly and axially aligned with the structure of the housing disposed between these two center lines to provide a compact structure by disposing the turbine airfoils inwardly of the inlet and outlet manifolds.

14. The rotary machine of claim 8 wherein the first turbopump rotates in a first circumferential direction and the second rotor pump rotates in a direction opposite to said first circumferential direction.

15. The rotary machine of claim 8 which further has a manifold for receiving pressurized helium, the manifold being in flow communication with at least one seal between the rotor assembly and the stator assembly of the rotary machine and is disposed between the flowpath for the first fluid and the flowpath for the second fluid to provide a pressurized buffer zone between the two fluids.

16. The rotary machine of claim 15 wherein the first fluid is cryogenic liquid hydrogen and the second fluid is cryogenic liquid oxygen and wherein the pressurized helium seal structure is disposed between the casing of the second turbopump and the rotor assembly of the second turbopump.

17. The rotary machine of claim 1 wherein the stator assembly includes a housing having sides, the housing further including the inlet manifold and outlet manifold, wherein the stator assembly includes additional structure spaced from either side of the housing, and the stator assembly further includes radially flexible casing structure connected tot he additional stator structure on either side of the housing and to the housing to accommodate differences in thermal growth between the manifolds for the turbine gases and the additional stator structure.

* * * * *

UNITED STATES PATENT AND TRADEMARK OFFICE
CERTIFICATE OF CORRECTION

PATENT NO. : 5,156,534

DATED : October 20, 1992

INVENTOR(S) : Burgy et al.

It is certified that error appears in the above-identified patent and that said Letters Patent is hereby corrected as shown below:

Column 12, Line 56: "tot he" Should be --to the--.

Signed and Sealed this

Fifth Day of October, 1993

*Attest:*

BRUCE LEHMAN

*Attesting Officer*     *Commissioner of Patents and Trademarks*